United States Patent Office 3,331,618
Patented July 18, 1967

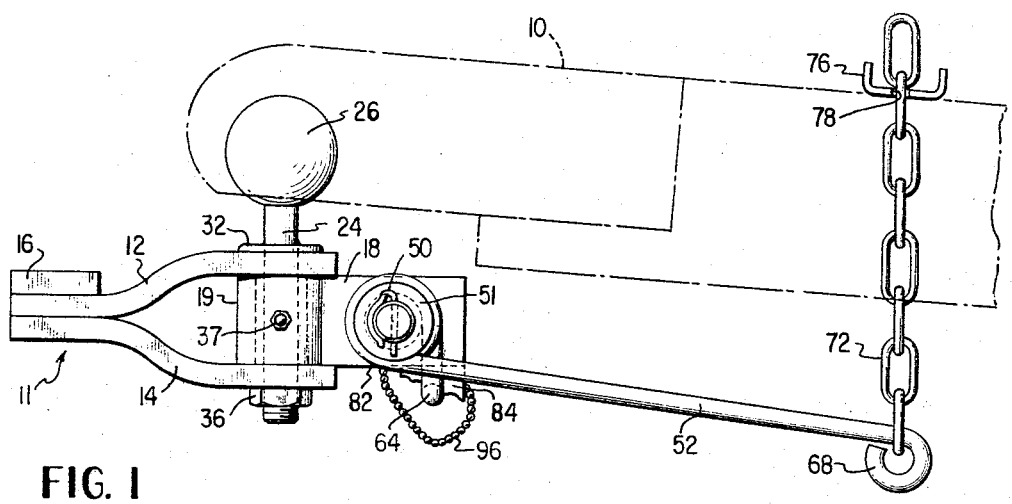
FIG. 1
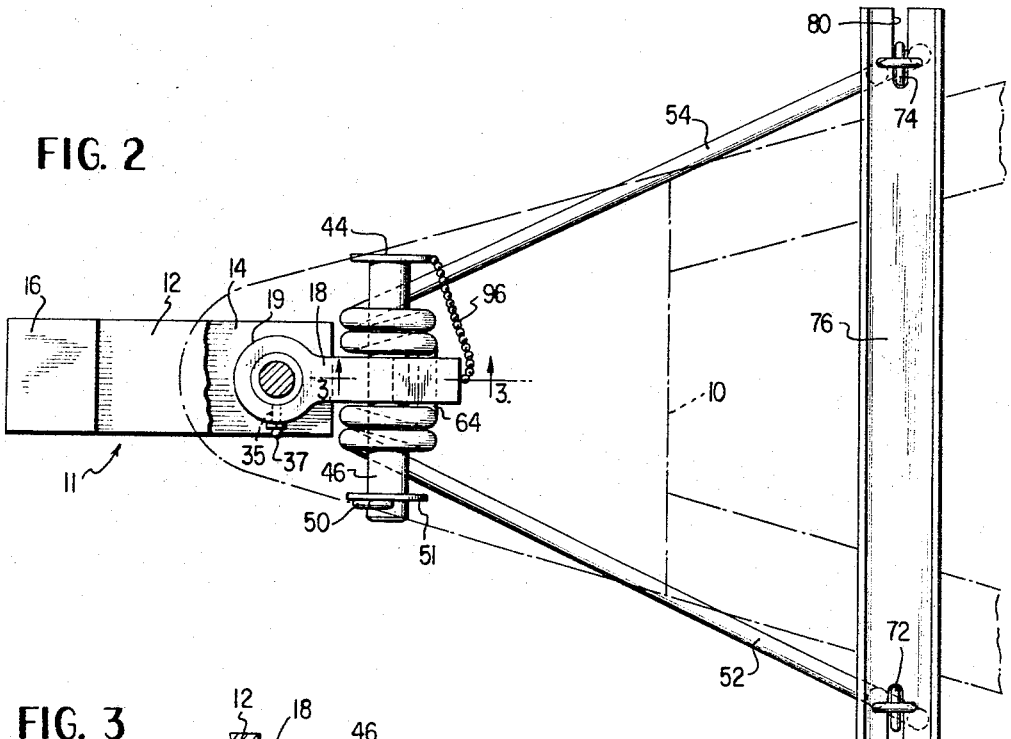
FIG. 2
FIG. 3
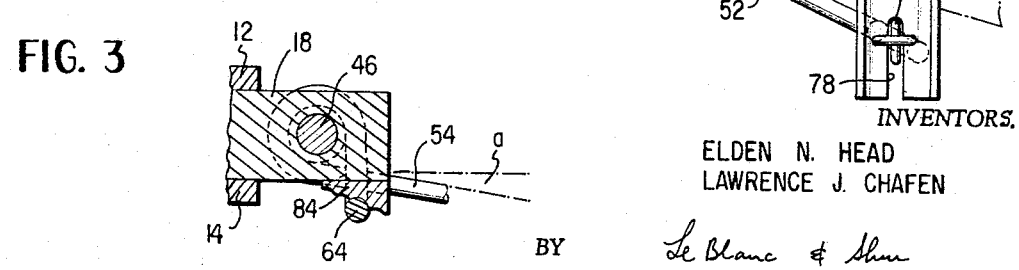
INVENTORS.
ELDEN N. HEAD
LAWRENCE J. CHAFEN
BY *Le Blanc & Shur*
ATTORNEYS.

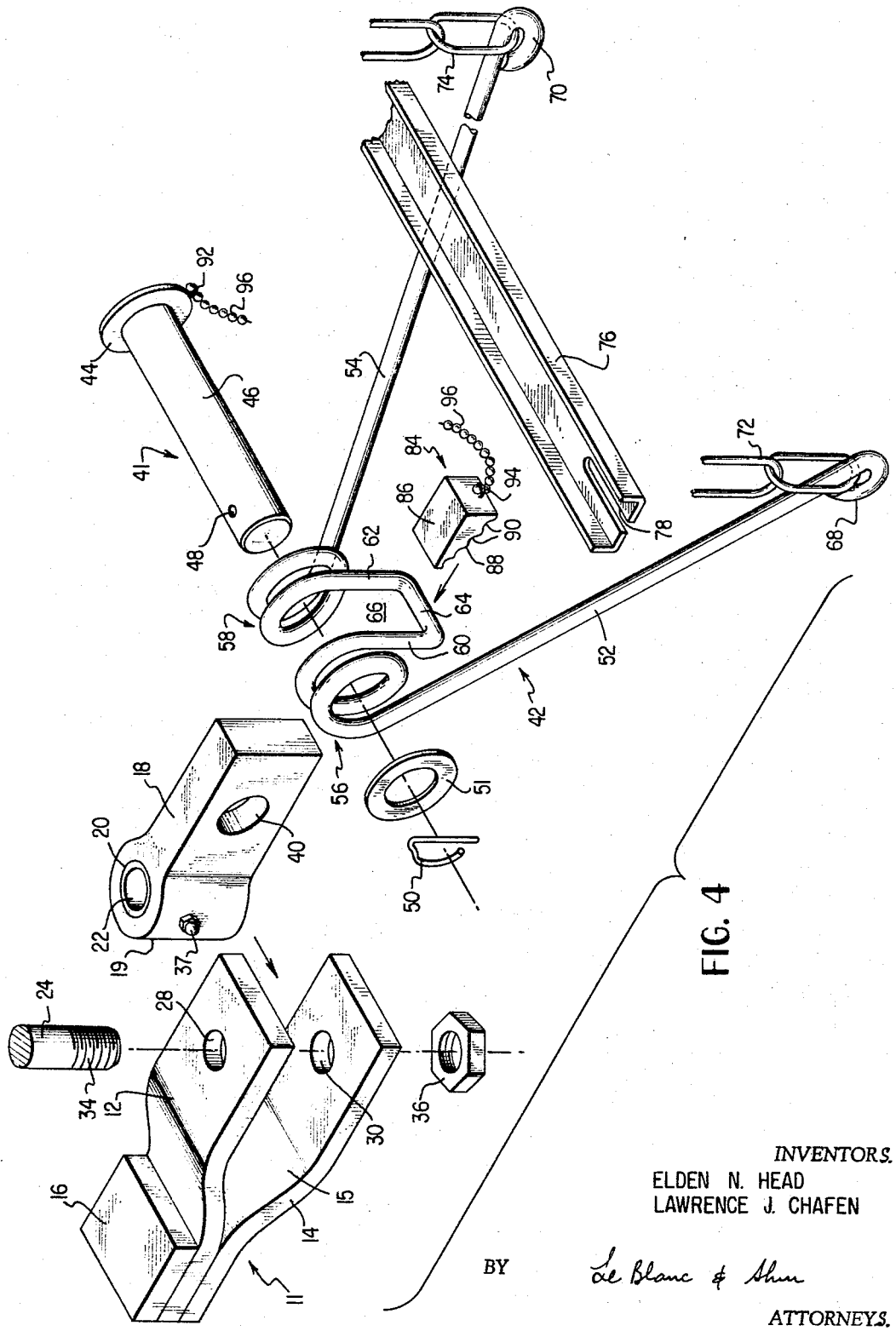

3,331,618
COIL TORSION SPRING TRAILER HITCH
Elden N. Head, 2440 Ave. G, and Lawrence J. Chafen, 3019 Ave. I, both of Council Bluffs, Iowa 51501
Filed Dec. 9, 1965, Ser. No. 512,702
10 Claims. (Cl. 280—406)

ABSTRACT OF THE DISCLOSURE

This device constitutes a trailer hitch for releasably connecting a tractor vehicle, such as an automobile or the like, to a towed vehicle, such as house or boat trailers or the like. The hitch employs a coil torsion spring adjustably attached to the drawbar and having lever arms extending rearwardly therefrom with extended portions connected to the tongue of the towed vehicle to apply a downward force and at the same time assure corresponding upward force on the portion of the hitch connected to the drawbar. A means is provided to adjust the degree of torsion by rotating the portion of the spring attached to the drawbar.

---

The present invention relates to a load leveling trailer hitch and more particularly to a trailer hitch of this type having substantially improved vertical flexibility as well as other desirable features which combine to provide a trailer hitch affording greater safety at higher speeds, and under extremely poor road conditions.

A wide variety of trailer hitches are available for releasably connecting a tractor vehicle such as an automobile or the like to house trailers or other towed vehicles. The various trailer hitches available may be classified in two types, namely the load equalizing or leveling type and the non-load equalizing type. The latter type, which includes bumper clamp-on hitches, axle clamp-on hitches, and frame hitches, comprise a ball member which cooperates with a suitable portion of the trailer to form a ball joint and connecting members adapted to support the ball and to provide a connection to some portion of the towing vehicle structure.

There are a number of disadvantages of these types of hitches. For example, the suspension system of an automobile is such that weight added between the front and rear wheels is distributed over the entire suspension system in a manner depending upon the placement of the added weight and upon the exact nature of the suspension system itself. On the other hand, additional weight positioned behind the rear wheels is supported substantially entirely by the rear suspension of the automobile, with little or no support by the front suspension. Thus, if sufficient weight is added in the rear of the vehicle, there will be a tendency for it to settle causing the front of the vehicle to be raised above its normal position, with a redistribution of the automobile weight toward the rear. Such weight redistribution causes a number of undesirable results, including changes in steering, riding and braking characteristics, which reduce the control of the vehicle. In addition, raising the front end causes a raising of the angle of the automobile headlights, which is dangerous to oncoming drivers when the headlights are in use.

Of course, attachment of a trailer to the towing vehicle produces precisely the above-described results. In order to overcome this, there have been provided a number of constructions generally known as load leveling or load equalizing hitches, which include various spring structures to apply an upward force on the rear of the towing vehicle to compensate for the added load on the rear suspension due to the weight of the trailer.

A wide variety of load leveling trailer hitches are available, and are almost always recommended for use in the towing of trailers weighing approximately 2000 pounds or more, as well as for the towing of moderately heavy weights by a small or already loaded vehicle. Such load leveling hitches are reasonably satisfactory, at least on level roads, and in fact all are capable of providing a quite satisfactory degree of control of side sway, pitch, and heave under most highway conditions. However, all of the heretofore available load leveling hitches have been found to provide substantially unsatisfactory performance on unlevel or poor roads, resulting from the fact that the present constructions do not possess a satisfactory degree of vertical flexibility of the spring structure. For example, if too great an upward force is applied on the rear of the towing vehicle by an insufficiently flexible spring, there may be insufficient weight on the rear wheels to maintain proper traction and power. Substantial vertical flexibility is needed in the spring portions of the hitch, whereby to insure that the upward force applied to the rear suspension of the towing vehicle remains within a suitable range independent of the road conditions.

As may be appreciated, the road conditions on highways, side roads, campground parking areas, picnic areas, shores and river banks, and the various other places into which towed vehicles are likely to be taken will often be far from satisfactory. With presently available construction, considerable difficulty may be encountered. For example, if the hitch possesses insufficient vertical flexibility, and a rut or dip in the road is traversed, the trailer load will be supported substantially by the front suspension system of the towing vehicle and by the trailer axle itself, resulting in a substantial decrease in the weight supported by the rear axle of the towing vehicle. Accordingly, the driving wheels of the automobile would be unable to provide sufficient traction on wet, muddy or icy roads. In addition, under such circumstances, the front suspension system of the towing vehicle is subjected to far more weight than it is designed to carry, which may result in substantial damage thereto.

In addition, when a ridge or rut is traversed diagonally, one side of the towing vehicle and the opposite side of the towed vehicle are elevated, creating a torque on the hitch. If the hitch possesses insufficient vertical flexibility, such torque may be transmitted to the frame of the towing vehicle, and may cause a possible twisting or bending thereof.

Further, when the rear wheels of the towing vehicle encounter a bump or ridge in the road, the lack of vertical flexibility which characterizes most load leveling trailer hitches results in the downward thrust on the trailer and the upward thrust on the towing vehicle being so reduced that there is greatly increased the danger that the two vehicles will become uncoupled. It has generally been found that all of the currently available load equalizing hitches are unsatisfactory under one or more of the three conditions outlined above.

An additional undesirable feature of many presently available load leveling hitches is the absence of sufficient road clearance below the hitch to permit travel over side roads and the like, where ruts, protrusions and high road centers are encountered.

Other areas, in which many of the load leveling hitches presently available are deficient, include compactness and light weight. It may be readily appreciated that it is highly desirable that the hitch be sufficiently small and compact to permit convenient storage. Further, an extremely heavy hitch is undesirable in that it increases the amount of weight which must be borne by the suspension systems of the two vehicles, and in addition adds to the difficulty of installation and removal.

Finally, the hitch should be designed so as to cause a minimum of interference with such articles as are positioned on or about the forward portion of the towed vehicle, i.e. the trailer tongue, since the latter often serves to support fuel tanks, braking devices, or other portions of the trailer gear. In addition to the substantial lack of vertical flexibility, most of the presently available trailer hitches are impractical or unsatisfactory for one or more of the additional reasons outlined above.

Among the particular load equalizing hitches presently available, there are those in which the upward thrust on the rear of the towing vehicle is provided by means of a series of leaf springs or other extended spring bars. In such construction, it may be understood that the vertical flexibility is determined by the length of the spring and thickness thereof. As the length is increased, the flexibility is also increased; however, in such constructions it is extremely difficult to provide any adjustment in the flexibility of the hitch.

On the other hand, if the length of the spring is decreased, adjustment of the flexibility becomes less of a problem, but as the length is decreased, the spring becomes more rigid. Accordingly, neither with short nor long leaf springs or bars is it possible to achieve any satisfactory degree of vertical flexibility. An additional difficulty with such devices is the lack of road clearance which results in the necessity that the spring or bar be positioned below the trailer tongue. Thus, when the towing vehicle reaches the crest of the hill (or the top of a sloping driveway) there is a tendency for the downwardly extending springs to strike the roadway causing decoupling of the trailer and the towing vehicle.

Another presently available trailer hitch employs a coil compression spring to apply a lift to the rear of the towing vehicle. The load carrying capacity of such a spring is determined by the diameter of the coils and the material from which the spring is made. When used in a load leveling hitch, such coils are positioned with the axis thereof perpendicular to the road, the vertical movement being limited to a distance equal to the sum of the open spaces between the coils. For example, assuming a five inch spring wound from one-half inch material with four working coils and an upper and lower seat coil, it may be determined that total vertical compression is limited to about two and one-half inches. On the other hand, if a long soft-acting spring is employed, it becomes difficult to provide an appropriate lever arrangement to operate it, and in addition, there results the problem of positioning the spring to assure adequate road clearance. Further, there is no convenient way to provide a tension adjustment for such springs to accommodate varying road conditions and loads.

An additional type of hitch construction which has been proposed employs an elastic coil spring operating in a generally similar configuration to the various leaf spring and spring bar constructions. Such structures again suffer from the problems of road clearance, insufficient flexibility, and lack of convenient means of adjustment. In addition, in one particular construction of this type, there is the additional problem that on very steep grades, substantially the entire weight of the towed vehicle is placed on the spring.

In summary, therefore, the semi-rigid nature of the above-described constructions tend to raise the towing vehicle off of its rear suspension system whenever the trailer axle or front wheels of the towing vehicle pass over a hump or ridge in the road. The various springs described above are generally large and bulky and are of necessity positioned in such a manner as to substantially decrease the road clearance and increase the possibility that the hitch will strike an obstacle extending upward from the road, causing either damage thereto or disengagement of the portions of the hitch between the towed and towing vehicles.

Finally, all of the presently available load leveling hitches are rather complicated in construction, and are difficult to install, hitch and unhitch. These constructions are expensive to manufacture, and in many instances are so attached to the towing vehicles as to raise considerable possibility of damage thereto from strain on the rear axle of the towing vehicle, or from twisting forces transmitted to the vehicle frame.

In contrast, this invention is characterized by almost complete absence of any of the above-described undesirable features. The present invention employs a coil torsion spring of unique configuration, then ends thereof comprising lever means extending longitudinally adjacent the lower surface of the trailer tongue and connected to the tongue to apply a downward force and to assure corresponding upward force on the portion of the hitch connected to the towing vehicle. The unique construction of the hitch is such as to permit a rapid and convenient adjustment of the degree of vertical flexibility, even to the extent of permitting the towed and towing vehicles to assume extremely steep angles relative to each other, without danger of the hitch striking the road surface or of the vehicles becoming uncoupled, while at the same time maintaining its load leveling properties so as to assure continuous and satisfactory distribution of weight on the rear suspension of the towing vehicle. In addition, the construction is such as to permit convenient and inexpensive modification of presently available hitches to permit the incorporation therein of the novel features of this invention.

Accordingly, it is an object of the present invention to provide an improved load leveling trailer hitch.

It is a further object of this invention to provide a load leveling trailer hitch having a heretofore unavailable degree of vertical flexibility.

It is an additional object of this invention to provide a trailer hitch as described above in which the degree of vertical flexibility is easily adjustable over considerable range.

It is a still additional object of this invention to provide a load leveling trailer hitch having a maximum degree of road clearance.

It is also an object of this invention to provide a load leveling trailer hitch so arranged as to minimize the possibility of decoupling of the vehicles due to contact of portions of the hitch with objects projecting from the road.

It is a further object of this invention to provide a trailer hitch as described above which will cause minimum interference with articles positioned on the front portion of the trailer.

It is also an object of this invention to provide a trailer hitch which will maintain suitable weight on the rear suspension system of the towing vehicle under substantially all road conditions.

It is a further object of this invention to provide a trailer hitch of moderately light weight and of simple construction whereby to permit rapid and convenient hitching and unhitching of the vehicles.

It is also an object of this invention to provide a load leveling trailer hitch including a horizontally positioned coil torsional spring. It is a further object of this invention to provide an improved load leveling trailer hitch having a coil torsional spring positioned transversely of the trailer tongue, and having extended torsion bars to provide a downward force at the front of the towed vehicle and a corresponding upward force on the rear suspension of the towing vehicle.

It is an additional object of this invention to provide means for modifying existing trailer hitches so as to incorporate therein the novel features described above. The exact nature of the present invention, as well as further objects and advantages thereof will become clear from consideration of the following specification and claims and the annexed drawings in which:

FIGURE 1 is a side elevation view showing the novel trailer hitch of the present invention, and in broken lines, the trailer tongue and its manner of connection to the hitch;

FIGURE 2 is a top plan view of the arrangement of FIGURE 1 with a portion cut away and again showing the trailer tongue in broken lines;

FIGURE 3 is a fragmentary vertical sectional view of a portion of FIGURE 2 taken along the line 3—3 therein; and FIGURE 4 is an exploded view of the trailer hitch shown in FIGURES 1 and 2 showing the details of the construction thereof.

Referring now more particularly to FIGURE 1, the construction of the present invention will be explained. The novel hitch 8, shown attached to a trailer tongue 10 comprises a draw bar, generally indicated at 11, having a plate-like upper draw bar portion 12, a plate-like lower portion 14 and a draw bar connecting member 16 adapted to be attached in any suitable manner to the frame of the towing vehicle. Upper plate 12 may comprise a portion of the draw bar of a trailer hitch already attached to the towing vehicle, in which case, lower plate 14 would be suitably attached thereto to provide an adapter for use of the hitch according to the present invention.

Of course, in the absence of a hitch already attached to the towing vehicle, draw bar portions 12, 14, and 16, as well as the remainder of the hitch of this invention may be provided as a unit and connected to the towing vehicle, preferably to the frame thereof, in the manner employed for the attachment of presently used load leveling hitches.

The ends of plate portions 12 and 14 are vertically spaced apart (see FIGURES 1 and 4) providing a clevis 15 for receiving therebetween an extended block member 18. As explained below, block 18 cooperates with the novel torsion spring of this invention to provide an upward thrust to the rear portion of the towing vehicle through plates 12 and 14, and connecting member 16.

Block 18 includes an enlarged generally cylindrical end 19 having a vertical bore 20 and a spacer bushing 22 inserted therein. The bushing 22 receives a supporting shaft 24 carrying at its upper end a trailer hitch ball 26 which provides the customary universal connection between the two vehicles. Plates 12 and 14 include a pair of aligned apertures 28 and 30 for receiving the lower end of shaft 24. The lower end of shaft 24 extends through spacer bushing 22 and thus pivotally secures the end 19 of block 18 in clevis 15. Shaft 24 includes a flange or shoulder 32 which rests against the upper surface of plate 12 to properly position hitch ball 26. The lower end of shaft 24 may include a threaded portion 34 which cooperates with a nut 36 to secure the above-described assembly in place.

The cylindrical end 19 of block 18 may include a suitable passage 35 having at the outer end thereof a grease fitting 37 to provide lubrication to the interface between the bore 20 and bushing 22.

The right end of block 18, as seen in the drawings, extends rearwardly, and includes a transverse aperture 40 for receiving a pin 41, by which is mounted the novel torsional spring 42 of the present invention. Pin 41 may be suitably constructed of steel or other like material and comprises a head portion 44 and an elongated shank portion 46 having at the end thereof an aperture 48 for receiving a cotter pin 50.

Spring 42 is fashioned from suitably tempered spring steel and includes lever means comprising a pair of elongated bars 52 and 54 connected by a pair of symmetrical coil portions 56 and 58 respectively. Portions 56 and 58 have colinear longitudinal axes, and may include any desired number of coils. These coils terminate in perpendicularly extending central portions 60 and 62 respectively, which are connected to a portion 64 radially displaced from the coil axes to form a substantially U-shaped loop 66 between the coil portions 56 and 58. As may be understood, spring 42 is connected to block 18 by the insertion of pin 41 through spring portions 56 and 58, and aperture 40, and the insertion into aperture 48 of cotter pin 50 abutting a washer 51 positioned between coil portion 56 and cotter pin 50.

With particular reference to FIGURES 3 and 4, the manner of variation of flexibility will be explained. When the apertures defined by the interior portions of coils 56 and 58 are aligned with bore 40 in block 18, and pin 41 is inserted and secured, there is provided an adjustable vertical clearance between horizontal portion 64 of the U-shaped loop 66 and the undersurface 82 of block 18. This clearance will vary in accordance with the angle of displacement of lever bars 52 and 54 from the horizontal (i.e. with tension transmitting springs unconnected to member 76), as indicated by the angle A in FIGURE 3. Specifically, angle A, and the length of bars 52 and 54 will determine the vertical displacement between the top of trailer tongue 10 and retaining loops 68 and 70, at the ends of bars 52 and 54. Thus, if the vertical clearance between horizontal portion 64 and the undersurface 82 of block 18 is fixed, there will be a particular downward force applied to trailer tongue 10 when chains 72 and 74 are inserted in slots 78 and 80 due to the torsion of coil portions 56 and 58. In addition, for a given vertical clearance, the torsion and thus the downward force applied by bars 52 and 54 through chains 72 and 74 can be further varied by the insertion into slots 78 and 80 of appropriate links of respective chains 72 and 74, thus providing an additional control for the vertical flexibility of the trailer hitch according to this invention. Further, as may be understood, increasing the length of bars 52 and 54 as permitted by the placement of the various trailer accessories on the upper side of trailer tongue 10, may result in an increase in the degree of adjustment of the force applied by chains 72 and 74.

In order to fixedly establish the clearance between horizontal portion 64 and undersurface 82 of block 18, the present construction includes a tension adjustment wedge 84 having a flat surface 86 and a tapered lower surface 88 including thereon a plurality of ripples or steps 90. The curvature of ripples 90 is made at least as great as that of spring portion 64 to permit convenient engagement therewith when surface 86 of wedge 84 is positioned against the lower surface 82 of block 18. For convenience, suitable loops 92 and 94 may be provided on pin head 44 and on wedge 84 respectively for attachment of a wedge retaining chain 96. As may be seen, the further forward that wedge 84 is positioned along surface 82, the greater will be the torsional bias of spring 42 or the angular displacement from the horizontal (i.e. angle A) of lever bars 52 and 54. By the proper selection of the position of wedge 84, considerable adjustment of the vertical flexibility or the downward force applied to trailer tongue 10 (and the corresponding upward force applied on the rear suspension of the towing vehicle) may be provided. In addition, as mentioned above, once wedge 84 is positioned and the rest angle of torsion bars 52 and 54 is determined, further adjustment of the downward force may be achieved by proper selection of the ones of the links of chains 72 and 74 to be engaged within slots 78 and 80. To this end chains 72 and 74 may advantageously be made sufficiently long to permit the desired degree of adjustment.

As an additional protective feature, a safety chain (not shown) may be provided, as is customary with presently available trailer hitch constructions.

As may be understood, the exact size and nature of the various portions of the above-described trailer hitch may vary in accordance with the particular conditions of use. In one operative embodiment, for use in the connection of a normal automobile with a typical house or camping trailer, or boat trailer, spring 42 may be fashioned from one-half inch diameter spring steel and may include two coils in each of coil portions 56 and 58. Pin 41 may be approximately six inches in length with a diameter of approximately one inch, to provide sufficient strength in view of the expected loads thereon. The coils of torsion spring 42, which of course must be at least of one inch interior diameter, are advantageously provided with an interior diameter of approximately one and one-quarter inches to permit convenient angular rotation thereof around the pin.

Wedge 84 may be advantageously approximately one and one-half inches long, and vary in thickness from approximately one-half to one-quarter of an inch, thereby assuring a corresponding variation in the vertical clearance between the lower surface of block 18, and U-shaped loop 66. The length of lever bars 52 and 54 may of course be varied in accordance with the arrangement of the trailer tongue 10 so as to permit the placement of member 76 in a way to minimize interference with fuel tanks, etc. already positioned upon the trailer tongue. In the particular operative embodiment referred to above, it is approximately one foot. A diameter of approximately one-quarter of an inch or less of the links of chains 72 and 74 provides adequate strength for tension adjusting chains 72 and 74. The entire weight of the trailer hitch described above is approximately twelve pounds including the weight of the required hitch ball, and can be adjusted by means of wedge 84 and chains 72 and 74 to apply a force varying from zero to several hundred pounds.

Attachment of the towed vehicle by means of the present hitch may be accomplished in a rapid and convenient manner. First, a suitable socket on the underside of trailer tongue 10 (not shown) is positioned over ball 26, and is allowed to rest thereon. Adjustment wedge 84 is then inserted within loop 66 and the appropriate ones of links 72 and 74 positioned in corresponding slots 78 and 80, so that the compensating force of spring 42 will substantially overcome the downward forces on the rear suspension. Under these conditions, both the towing vehicle and the trailer will be substantially level. The entire process may be accomplished in five minutes or less, and it may be understood that the disconnection of the towing and towed vehicles may be accomplished in an equally rapid and convenient manner. Thus, it may be seen that with proper tension applied to level the hitch load of the towing vehicle, and the trailer to which it is attached, it is obvious that the coil spring 42 of this invention provides sufficient vertical flexibility to permit the travel of the vehicles over roads having substantially any surface conditions, without transferring an undue amount of weight to the front suspension system of the towing vehicle, or relieving the rear suspension of sufficient weight to substantially destroy the traction of the rear wheels thereof. Similarly, travel of the vehicles diagonally over various obstacles in the road, whereby one side of the towing vehicle and the opposite side of the trailer are raised above the corresponding opposite sides, may be accomplished with the present invention without the placing of undue torisonal stresses on the frame of the towing vehicle.

In addition, the construction of the present invention may be conveniently used as an alternative to the installation of overload spring and shock absorbers when the load to be carried in a particular motor vehicle is considerably in excess of that normally carried thereby. For example, a light trailer axle may be attached to the overloaded vehicle in exactly the same manner as would be a trailer, by attachment to the novel trailer hitch described above. As in the case of a trailer, proper adjustment of the tension on spring 42 would be made to compensate for the increased load on the rear suspension (as evidenced by leveling of the vehicle). Thus, the necessity of installing heavy duty shock absorbers and springs is avoided, and once the abnormal load is removed, the utility axle may be readily disconnected, leaving the vehicle suspension system in its original form.

While a specific embodiment of this invention has been shown and described in detail, it should be recognized that a variety of modifications therein are possible within the scope of this invention. For example, substantially all of the torsion is provided by coils 56 and 58; therefore, it may be recognized that spring bars 52 and 54 serve primarily as levers for applying and adjusting the downward force on trailer tongue 10. Accordingly, the length of bars 52 and 54 may be increased or decreased, as convenient, and it should be recognized that the longer the bar, the finer will be the range of tension adjustment which will be possible, since for a given clearance between block 18 and horizontal spring portion 64, the vertical displacement of spring bars 52 and 54 from the top of trailer tongue 10 will vary in proportion to the length of the bars.

Further, it is possible to vary the position of aperture 40 within adapter block 18, or to modify the shape of the adapter block so as to permit the positioning of coil portions 56 and 58 directly beneath ball 26, if desired, although the resultant road clearance would be somewhat decreased.

In addition to the variation in downward force provided by the positioning of block 84 and the length of chains 72 and 74, it should be recognized that considerable variation in the tension provided may be achieved simply by removing spring 42 and inserting a heavier spring in its place.

Additional variations, such as the provision of a suitable projecting member integral with trailer tongue 10 as a replacement for channel-shaped member 76, may readily occur to those skilled in the art in light of the above teachings.

Thus, the invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A trailer hitch for connecting a towing vehicle and a towed vehicle comprising a drawbar adapted for connection to the towing vehicle, means for coupling the drawbar to the towed vehicle, a torsional spring means rotatably connected to the drawbar, further means for connecting the spring means and the towed vehicle to apply a downward force to the latter, means for applying an adjustable torsional bias to the torsional spring to vary the downward force applied to the towed vehicle, the means for connecting the spring means to the towed vehicle comprising lever means extending rearwardly of the spring means, and upwardly extended linking means to connect the lever means to the towed vehicle.

2. A trailer hitch for connecting a towing vehicle and a towed vehicle comprising a drawbar adapted for connection to the towing vehicle, means for coupling the drawbar to the towed vehicle, a torsional spring means rotatably connected to the drawbar, further means for connecting the spring means and the towed vehicle to apply a downward force to the latter, means for applying an adjustable torsional bias to the torsional spring to vary the downward force applied to the towed vehicle, the torsional spring means including a connecting portion disposed adjacent to the drawbar and where the means for applying the adjustable torsional bias comprises means to vary the displacement between the drawbar and the connecting portion of the torsional spring.

3. A trailer hitch for connecting a towing vehicle and a towed vehicle comprising a drawbar adapted for connection to the towing vehicle, means for coupling the drawbar to the towed vehicle, a torsional spring means rotatably connected to the drawbar, further means for connecting the spring means and the towed vehicle to apply a downward force to the latter, means for applying an adjustable torsional bias to the torsional spring to vary the downward force applied to the towed vehicle, the drawbar including a rearwardly extending portion, support means positioned transversely of the rearwardly extending portion, and where the spring means comprises first and second coil portions having substantially colinear longitudinal axes, the coil portions being connected by an extended portion radially displaced from the longitudinal axes of the coils, the coil means being positioned on the transverse support means, one coil portion being disposed on each side of the extended portion of the drawbar, the radially displaced portion being disposed below the extended portion, and where the means to provide a torsional bias comprises means to vary the vertical displacement between the radially displaced portion of the spring and the extended portion of the drawbar.

4. The apparatus as set forth in claim 3, where the last-named means comprises a wedge-shaped block slideably positioned between the extended portion of the draw bar and the radially displaced portion of the spring means.

5. The trailer hitch as set forth in claim 3, wherein the extended portion of the draw bar includes a clevis portion at one end thereof including first and second vertically spaced horizontal plates having aligned apertures therethrough, an extended block member pivotally mounted in the clevis and including a vertical bore, the apertures and the vertical bore being aligned and fitted with a removable shaft for pivotally supporting the block member thereon.

6. A trailer hitch for connecting a towed and a towing vehicle comprising a draw bar for connection to the towing and towed vehicles, the draw bar including a clevis portion at one end thereof, an extended block member pivotally mounted in the clevis, spring means including a coil portion pivotally mounted transversely of the block member, the spring means further including lever means extending rearwardly of the coil portion, means for connecting the lever means to the towed vehicle and for transmitting a downward force to the latter, and means to adjustably limit the pivotal freedom of the coil portion to adjust the downward force transmittable to the towed vehicle through the lever means.

7. The trailer hitch as set forth in claim 6 wherein the coil means is a unitary structure including first and second coils having colinear longitudinal axes, the coils being connected by a U-shaped loop comprising two central portions disposed generally normal to the longitudinal axes of the coils, and a third portion, radially displaced from the longitudinal axes of the coils, and connected between the two central portions.

8. The trailer hitch of claim 7 wherein the block member includes a transverse aperture with a removable pin positioned therein, for pivotally supporting the coil means, the first and second coils being disposed on opposite sides of the transverse aperture, the central portions of the U-shaped loop being disposed adjacent the sides of the block member, and the third portion of the U-shaped loop being disposed below the block member.

9. The trailer hitch as set forth in claim 7 where the means to limit the pivotal freedom of the coil portion includes means positioned between the block member and the third portion of the U-shaped loop for adjustably fixing the clearance therebetween.

10. The apparatus as set forth in claim 7 where the lever means comprises a pair of elongated bars extending horizontally adjacent the towed vehicle, and comprising a unitary structure with the coil means, and further including vertically positioned links connected to the free end of each of the bars, and means for connecting the links to apply substantially equal downward forces to the towed vehicle.

References Cited

UNITED STATES PATENTS 2,793,878 5/1957 Toland _____ 280—406
2,952,475 9/1960 Reese _____ 280—406

LEO FRIAGLIA, *Primary Examiner.*